United States Patent
Ito et al.

(10) Patent No.: US 11,835,009 B2
(45) Date of Patent: Dec. 5, 2023

(54) HYDROGEN DISCHARGE CONTROL SYSTEM AND HYDROGEN DISCHARGE CONTROL METHOD FOR HYDROGEN ENGINE VEHICLE

(71) Applicant: TOYOTA JIDOSHA KABUSHIKI KAISHA, Toyota (JP)

(72) Inventors: Naoaki Ito, Kariya (JP); Yutaka Sawada, Nagakute (JP); Toshihisa Tanaka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/950,558

(22) Filed: Sep. 22, 2022

(65) Prior Publication Data

US 2023/0102981 A1    Mar. 30, 2023

(30) Foreign Application Priority Data

Sep. 30, 2021    (JP) .................................. 2021-161059

(51) Int. Cl.
*F02D 41/38*     (2006.01)
*F17C 1/16*      (2006.01)
*F17C 13/02*     (2006.01)

(52) U.S. Cl.
CPC ............... *F02D 41/38* (2013.01); *F17C 1/16* (2013.01); *F17C 13/026* (2013.01);
(Continued)

(58) Field of Classification Search
CPC ............ F02D 41/38; F02D 2200/0602; F02D 2200/0608; F02D 2200/60; F02D 19/027; F02D 41/0027; F02D 19/024; F17C 1/16; F17C 13/026; F17C 2203/0604; F17C 2203/066; F17C 2221/012; F17C 2250/03; F17C 2250/0439; F17C 2250/0636;
(Continued)

(56) References Cited

U.S. PATENT DOCUMENTS

2005/0247123 A1*  11/2005  Fuse ................... G01F 15/0755
                                                        73/290 R
2014/0311454 A1*  10/2014  Pursifull ............. F02D 19/0628
                                                        123/468
2017/0292446 A1*  10/2017  Hwang ..................... F02C 3/20

FOREIGN PATENT DOCUMENTS

CA        2819966 A1 *   9/2013   ................ F01P 3/02
JP     2003-013765 A     1/2003
WO   WO-2012014333 A1 *  2/2012   ........... F02D 19/022

* cited by examiner

*Primary Examiner* — Joseph J Dallo
(74) *Attorney, Agent, or Firm* — Dinsmore & Shohl LLP

(57) ABSTRACT

A hydrogen discharge control system controls a hydrogen discharge flow rate in a hydrogen engine vehicle that discharges hydrogen from a hydrogen tank in which a resin liner is laminated on an inner wall, to a hydrogen engine, in accordance with an accelerator operation amount. The hydrogen discharge control system comprises a control device. The control device estimates a temperature attained in the hydrogen tank after a predetermined time elapses with the accelerator operation amount at a maximum during an on operation of an accelerator, based on a temporal temperature gradient in the hydrogen tank and a temperature in the hydrogen tank, and when the temperature attained is no higher than a first predetermined temperature, performs discharge limit control for limiting a maximum value of the hydrogen discharge flow rate from the hydrogen tank to a predetermined flow rate.

4 Claims, 6 Drawing Sheets

(52) U.S. Cl.
CPC ............ *F02D 2200/0602* (2013.01); *F02D 2200/0608* (2013.01); *F02D 2200/60* (2013.01); *F17C 2203/0604* (2013.01); *F17C 2203/066* (2013.01); *F17C 2221/012* (2013.01); *F17C 2250/03* (2013.01); *F17C 2250/0439* (2013.01); *F17C 2250/0636* (2013.01); *F17C 2265/066* (2013.01)

(58) Field of Classification Search
CPC ........ F17C 2265/066; F17C 2205/0326; F17C 2223/0123; F17C 7/00; F17C 2203/0619; F17C 2223/036; F17C 2225/0123; F17C 2250/032; F17C 2250/043; F17C 2250/0482; F17C 2260/02; F17C 2270/0168; F17C 13/02; F17C 13/025; F02M 21/0206

See application file for complete search history.

HYDROGEN DISCHARGE CONTROL SYSTEM AND HYDROGEN DISCHARGE CONTROL METHOD FOR HYDROGEN ENGINE VEHICLE

CROSS-REFERENCE TO RELATED APPLICATION

This application claims priority to Japanese Patent Application No. 2021-161059 filed on Sep. 30, 2021, incorporated herein by reference in its entirety.

BACKGROUND

1. Technical Field

The disclosure relates to a hydrogen discharge control system and a hydrogen discharge control method for a hydrogen engine vehicle.

2. Description of Related Art

Japanese Unexamined Patent Application Publication No. 2003-013765 (JP 2003-013765 A) describes a hydrogen engine vehicle that uses hydrogen as fuel. In the hydrogen engine vehicle, hydrogen stored in a hydrogen tank is supplied to a combustion chamber of a hydrogen engine, and the hydrogen engine is run.

SUMMARY

In a hydrogen engine vehicle, hydrogen is discharged to a hydrogen engine in accordance with an amount of operation of an accelerator such as an accelerator pedal, from a hydrogen tank formed by laminating a resin liner on an inner wall thereof, or the like. In this case, in the hydrogen engine vehicle, the discharge flow rate of hydrogen discharged from the hydrogen tank in accordance with the amount of operation of the accelerator is great in comparison with that of a fuel cell electric vehicle, in which the hydrogen discharged from within the hydrogen tank is used as fuel to generate electricity. Further, the higher the residual pressure in the hydrogen tank is, the greater the temporal temperature gradient within the hydrogen tank is, and accordingly the temperature in the hydrogen tank decreases greatly at the time of hydrogen discharge.

Accordingly, depending on the current temperature inside the hydrogen tank and the residual pressure therein, the acceptable lower limit temperature of the resin liner of the hydrogen tank may be quickly reached due to temperature decrease caused by discharge of hydrogen within the hydrogen tank, when a state in which the amount of operation of the accelerator is maximum continues, or the frequency of that state becomes high. In such cases, hydrogen discharge is stopped in order to protect the resin liner, and accordingly the vehicle stops traveling. Consequently, the vehicle cannot continue traveling until the in-tank temperature rises.

The disclosure provides a hydrogen discharge control system and a hydrogen discharge control method for a hydrogen engine vehicle, which can protect a resin liner of a hydrogen tank while enabling continued traveling of the vehicle.

According to an aspect of the disclosure, a hydrogen discharge control system that controls a hydrogen discharge flow rate in a hydrogen engine vehicle that discharges hydrogen from a hydrogen tank in which a resin liner is laminated on an inner wall, to a hydrogen engine, in accordance with an accelerator operation amount, includes a control device. The control device is configured to, during an on operation of an accelerator, estimate a temperature attained in the hydrogen tank after a predetermined time elapses with the accelerator operation amount at a maximum, based on a temporal temperature gradient in the hydrogen tank that is determined by a residual pressure in the hydrogen tank when performing hydrogen discharge, and a temperature in the hydrogen tank, and when the temperature attained is no higher than a first predetermined temperature, perform discharge limit control for limiting a maximum value of the hydrogen discharge flow rate from the hydrogen tank to a predetermined flow rate.

According to the hydrogen discharge control system of the disclosure, when the current temperature in the hydrogen tank is low or the residual pressure inside is great, even when a state in which the amount of operation of the accelerator is maximum continues, or the frequency of this state is high, the temperature in the hydrogen tank can be suppressed from quickly reaching the acceptable lower limit temperature or lower, while enabling the vehicle to continue traveling. Thus, the resin liner of the hydrogen tank can be protected.

Also, in the hydrogen discharge control system of the above aspect, the control device may be configured to, when the temperature in the hydrogen tank after performing the discharge limit control is no lower than a second predetermined temperature that is higher than the temperature in the hydrogen tank at a start of the discharge limit control, cancel limitation on the hydrogen discharge flow rate.

According to the above configuration, following limit control of hydrogen discharge being performed, when the temperature in the hydrogen tank rises to or exceeds the second predetermined temperature due to a state of the accelerator being off occurring often, or the frequency of small amounts of operation of the accelerator being high, or the like, normal driving can be resumed, and accordingly the time of causing the user to feel uncomfortable about the traveling performance can be reduced.

According to another aspect of the disclosure, a hydrogen discharge control method for controlling a hydrogen discharge flow rate in a hydrogen engine vehicle that discharges hydrogen from a hydrogen tank in which a resin liner is laminated on an inner wall, to a hydrogen engine, in accordance with an accelerator operation amount. The control method comprises, during an on operation of an accelerator, estimating a temperature attained in the hydrogen tank after a predetermined time elapses with the accelerator operation amount at a maximum, based on a temporal temperature gradient in the hydrogen tank that is determined by a residual pressure in the hydrogen tank when performing hydrogen discharge, and a temperature in the hydrogen tank, and when the temperature attained is no higher than a first predetermined temperature, performing discharge limit control for limiting a maximum value of the hydrogen discharge flow rate from the hydrogen tank to a predetermined flow rate.

The hydrogen discharge control method of the above aspect may further comprise, when the temperature in the hydrogen tank after performing the discharge limit control is no lower than a second predetermined temperature that is higher than the temperature in the hydrogen tank at a start of the discharge limit control, canceling limitation on the hydrogen discharge flow rate.

According to the hydrogen discharge control system of the hydrogen engine vehicle according to the disclosure, the resin liner of the hydrogen tank can be protected while enabling continued traveling of the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
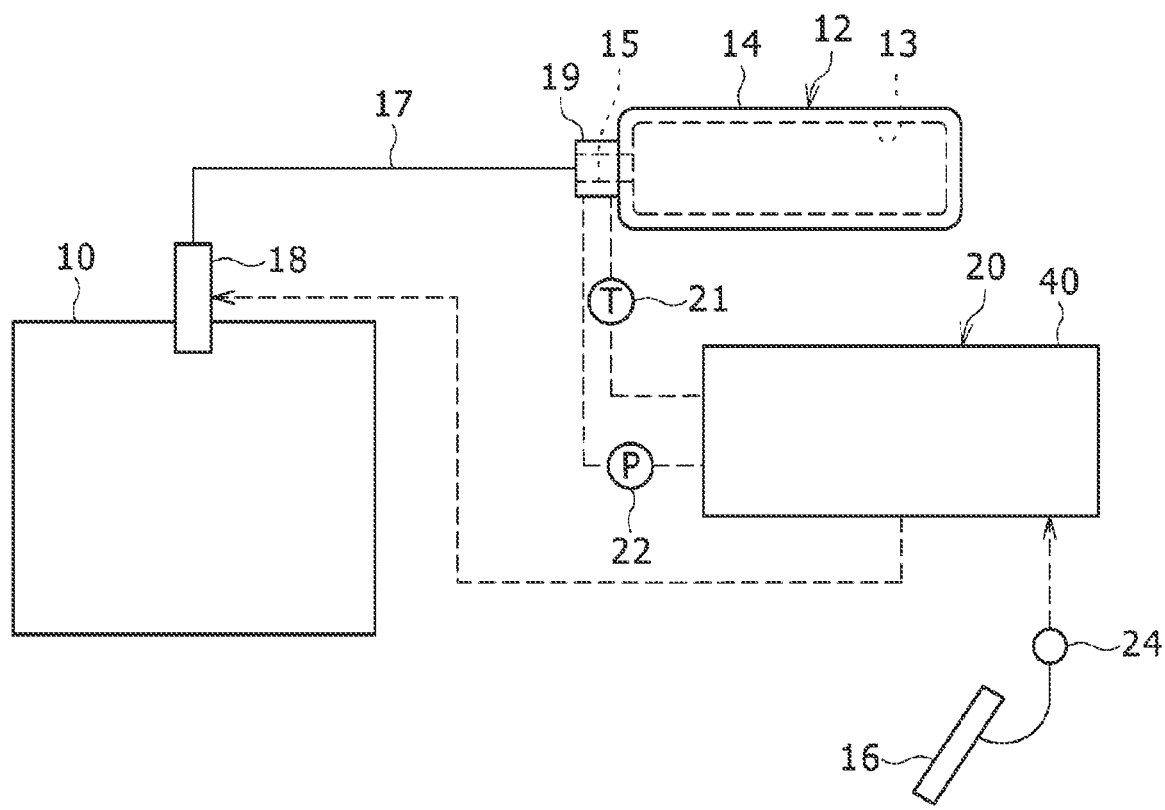
FIG. 1 is a schematic configuration diagram of a hydrogen discharge control system for a hydrogen engine vehicle according to an embodiment of the disclosure.

An embodiment of a hydrogen discharge control system for a hydrogen engine vehicle according to the disclosure will be described below. FIG. 1 illustrates a schematic configuration of a hydrogen discharge control system 20 according to the embodiment. The hydrogen discharge control system 20 is installed in a hydrogen engine vehicle that travels using a hydrogen engine 10 as a drive source. The hydrogen engine vehicle includes the hydrogen engine 10, a hydrogen tank 12, an accelerator 16 such as an accelerator pedal operated by a driver to instruct acceleration/deceleration, and a control device 40 that controls driving of the hydrogen engine 10 in accordance with operation of the accelerator 16. The hydrogen engine vehicle discharges hydrogen from the hydrogen tank 12 into a combustion chamber of the hydrogen engine 10 through hydrogen piping 17 and an injector 18, in accordance with an operation amount of the accelerator 16 (hereinafter, referred to as "accelerator operation amount").

The hydrogen engine 10 causes combustion of an air-fuel mixture of hydrogen and air in a combustion chamber, by ignition using a spark plug or the like. The hydrogen engine 10 rotates a crankshaft by reciprocating action of a piston under the combustion energy. For this purpose, hydrogen is conveyed from the hydrogen tank 12 to the injector 18 connected to the combustion chamber of the hydrogen engine 10 by the hydrogen piping 17 and a delivery pipe (omitted from illustration), and is injected into the combustion chamber from the injector 18.

The hydrogen tank 12 stores hydrogen in a high-pressure state. The hydrogen tank 12 is a hollow container, with a resin liner 13 laminated on an inner wall thereof. The resin liner 13 is formed of a resin that has gas barrier properties with respect to hydrogen gas, such as a polyamide resin. A reinforcing layer 14 is provided on an outer wall of the hydrogen tank 12. The reinforcing layer 14 is provided to improve the strength of the hydrogen tank, and is made of carbon fiber reinforced polymer (CFRP), for example. A neck 15 that is made of metal is provided at one end of the hydrogen tank 12, and a valve 19 is provided at the neck 15.

The neck 15 is provided with a hydrogen discharge path connected to the hydrogen piping 17 and a hydrogen filling path used for filling the hydrogen tank with hydrogen at a hydrogen station.

A temperature sensor 21 and a pressure sensor 22 are connected to the neck 15 of the hydrogen tank 12. The temperature sensor 21 detects the in-tank temperature inside the hydrogen tank 12, and the pressure sensor 22 detects residual pressure inside the hydrogen tank 12. Detection signals from the temperature sensor 21 and the pressure sensor 22 are transmitted to the control device 40.

The accelerator 16 is provided to the front of the driver's seat, and the accelerator operation amount thereof is detected by an accelerator sensor 24. Detection signals of the accelerator sensor 24 are transmitted to the control device 40. The accelerator sensor 24 also detects that the accelerator 16 is depressed by the driver due to the accelerator operation amount being no less than a predetermined amount, i.e., the accelerator 16 is on, and that the accelerator 16 is not depressed by the driver due to the accelerator operation amount being below than a predetermined amount, i.e., the accelerator 16 is off.

The hydrogen discharge control system 20 includes the injector 18, the temperature sensor 21, the pressure sensor 22, the accelerator sensor 24, and the control device 40. The hydrogen discharge control system 20 controls the hydrogen discharge flow rate in the hydrogen engine vehicle.

The control device 40 includes a microcomputer that has an arithmetic processing unit such as a central processing unit (CPU) and a storage unit such as memory. When the vehicle is being driven, the control device 40 controls the hydrogen discharge flow rate injected from the injector 18 into the hydrogen engine 10 in accordance with the accelerator operation amount. When the accelerator operation amount is great, the hydrogen discharge flow rate is increased, and when the accelerator operation amount is small, the hydrogen discharge flow rate is decreased. When the accelerator 16 is off, injection of hydrogen from the injector 18 into the hydrogen engine 10 is stopped.

The in-tank temperature of the hydrogen tank 12 decreases due to the in-tank pressure decreasing, from the discharge of hydrogen. Conversely, when the hydrogen tank 12 is filled with hydrogen from a fill-up of hydrogen at a hydrogen station, the in-tank pressure increases and the temperature rises accordingly. Further, when the accelerator 16 is off or the operation amount of the accelerator 16 is frequently small, the in-tank temperature gradually rises so as to approach the ambient air temperature, in accordance with the ambient air temperature around the hydrogen tank 12.

Figure 2:
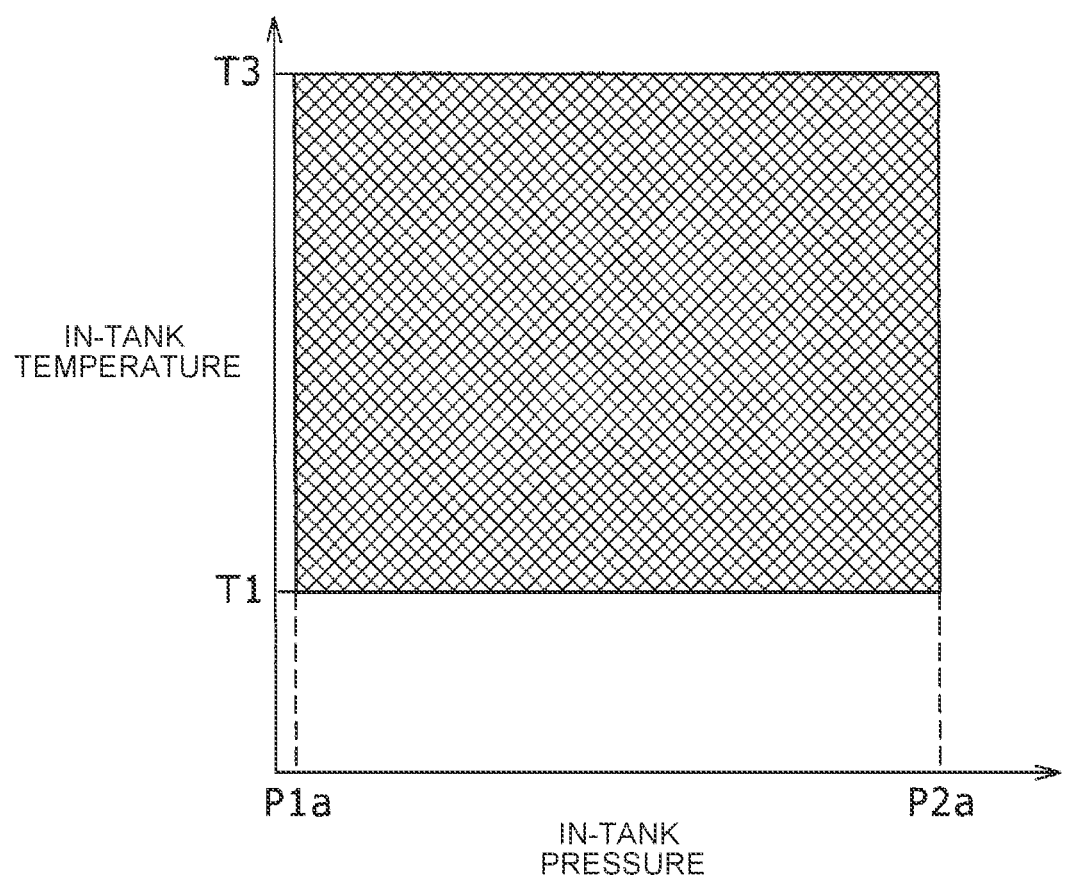
FIG. 2 is a diagram showing an example of an acceptable range of pressure and temperature in a hydrogen tank.

FIG. 2 is a diagram showing an example of an acceptable range of in-tank temperature and in-tank pressure. In FIG. 2, the acceptable range is indicated by a cross-hatched portion. The in-tank temperature needs to be maintained at no lower than a first predetermined temperature T1, which is an acceptable lower limit temperature, and no higher than a third predetermined temperature T3, set in a range of −80° C. to −50° C., for example. When the in-tank temperature is excessively low, there is a possibility that necessary mechanical properties of the resin liner 13 cannot be secured. Accordingly, the control device 40 performs control such that the in-tank temperature is maintained no lower than the first predetermined temperature T1. Specifically, when the in-tank temperature reaches the first predetermined temperature T1 or lower, the discharge of hydrogen from the injector 18 is stopped. Immediately prior to the in-tank temperature reaching the first predetermined temperature T1, or when reaching the first predetermined temperature T1, the control device 40 performs annunciation by displaying a warning or emitting a warning sound generated to notify the driver that the in-tank temperature is approaching the first predetermined temperature T1 or has reached the first predetermined temperature T1.

On the other hand, when the discharge of hydrogen from the injector 18 is stopped while the vehicle is being driven, the vehicle stops traveling, and accordingly the vehicle cannot continue travelling until the in-tank temperature rises. In order to resolve such an inconvenience, according to the embodiment, when an on operation of the accelerator 16 is performed, the control device 40 estimates the temperature attained in the hydrogen tank 12 after a predetermined time has elapsed at the maximum accelerator operation amount, and when the temperature attained is no higher than the first predetermined temperature T1, performs discharge limit control for limiting a maximum value of the hydrogen discharge flow rate from the hydrogen tank 12 to a predetermined flow rate. Accordingly, the vehicle can continue to travel while protecting the resin liner 13 of the hydrogen tank 12.

The discharge limit control performed by the hydrogen discharge control system will be described below in detail. As described above, the in-tank temperature decreases due to discharge of hydrogen. On the other hand, the degree to which the in-tank temperature decreases due to the discharge of hydrogen varies depending on the residual pressure in the hydrogen tank 12 (in-tank residual pressure). Specifically, the greater the in-tank residual pressure is, the greater the temporal temperature gradient in the hydrogen tank 12 is.

Figure 3:
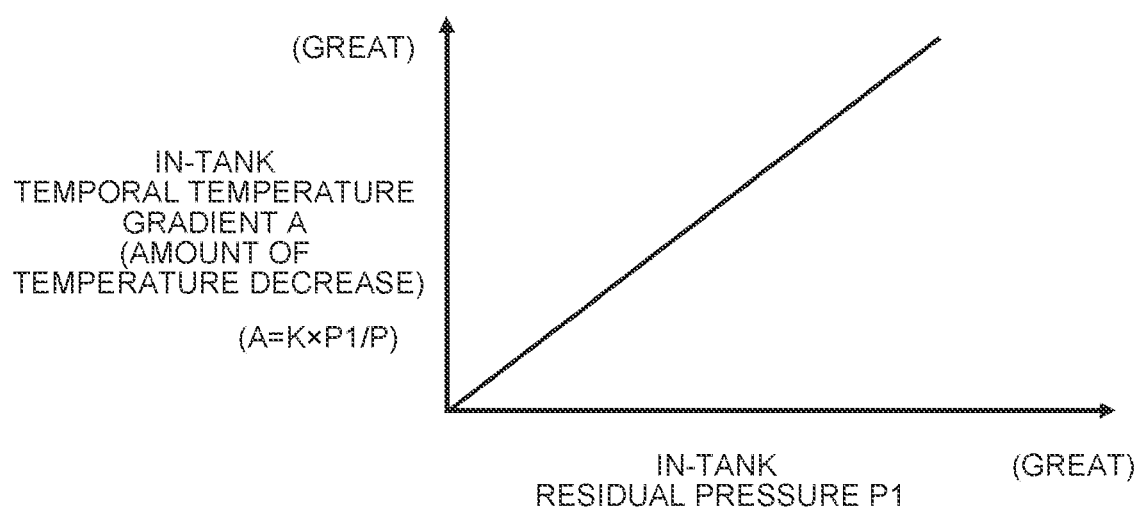
FIG. 3 is a diagram showing a relation between residual pressure P1 in the hydrogen tank at the current time and a temporal temperature gradient A in the hydrogen tank when the accelerator operation amount is maximum.

FIG. 3 shows a relation between the in-tank residual pressure at the current time and a temporal temperature gradient A in the hydrogen tank 12 when the accelerator operation amount is maximum, i.e., the amount of temperature decrease per unit time. As shown in FIG. 3, the temporal temperature gradient A when the accelerator operation amount is maximum increases in a linear proportional relation with the in-tank residual pressure. More specifically, the temporal temperature gradient A is found by $$A = K \times P1/P \quad (1)$$

in which K is a constant that represents the amount of temperature decrease per unit time at the maximum discharge flow rate of hydrogen from the hydrogen tank 12, P1 represents the current in-tank residual pressure, and P is a constant that represents the pressure in the tank when the hydrogen tank 12 is full. Using this temporal temperature gradient A, an in-tank temperature Ta at the current time t1, and an in-tank residual pressure P1, enables an in-tank attainment temperature Tx at a time t2 after a predetermined amount of time has elapsed to be estimated, when assuming that the accelerator operation amount is maintained at the maximum from time t1.

Figure 4:
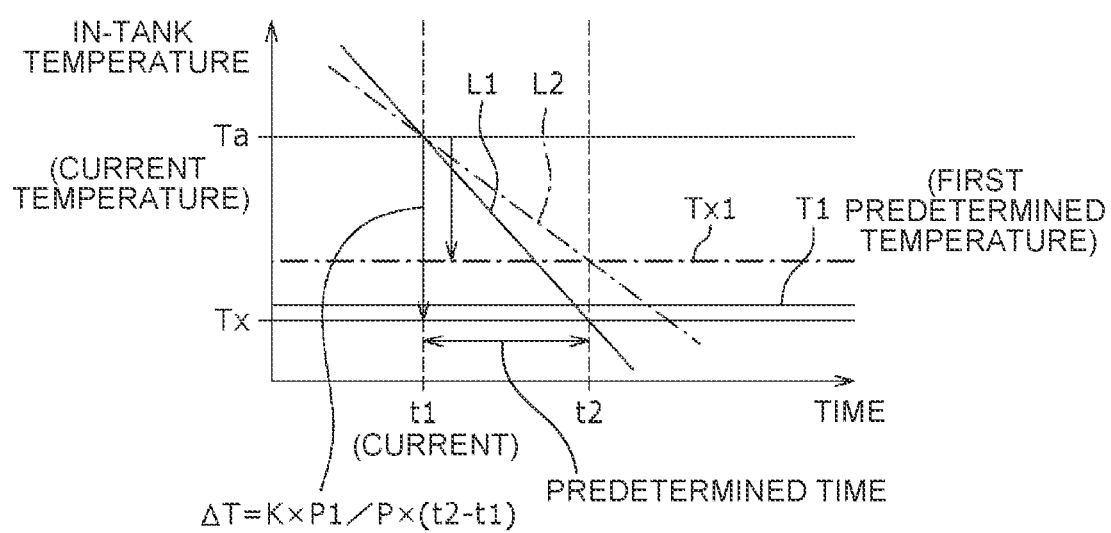
FIG. 4 is a diagram showing a method for estimating an in-tank attainment temperature Tx after a predetermined amount of time from time t1, when assuming that the maximum accelerator operation amount is maintained, in a relation between in-tank temperature and time.

FIG. 4 shows a method for estimating the in-tank attainment temperature Tx at time t2 after a predetermined amount of time from time t1, when assuming that the maximum accelerator operation amount is maintained, in the relation between in-tank temperature and time. In FIG. 4, the horizontal axis represents time, and the vertical axis represents the in-tank temperature. The relation between the current time t1 and the time of temperature decrease from the in-tank temperature Ta is represented by a continuous line L1.

As described above, the temporal temperature gradient A of the in-tank temperature when the accelerator operation amount is maximum is obtained by Expression (1), and accordingly a temperature decrease ΔT at time t2 after a predetermined amount of time (t2–t1) is found as follows.

$$\Delta T = A \times (t2-t1) = K \times P1/P \times (t2-t1) \quad (2)$$

Accordingly, when the in-tank temperature Ta at time t1 and the in-tank residual pressure P1 are known, the in-tank attainment temperature Tx at time t2 can be estimated as follows.

$$Tx = Ta - \Delta T = Ta - K \times P1/P \times (t2-t1) \quad (3)$$

According to the embodiment, this relation is used by the control device 40 when an on operation of the accelerator is performed, to estimate the in-tank attainment temperature Tx after a predetermined amount of time elapsing at the maximum accelerator operation amount, based on the temporal temperature gradient A of the in-tank temperature at the time of hydrogen discharge, which is determined by the in-tank residual pressure P1, and the in-tank temperature Ta. When estimation is made that the in-tank attainment temperature Tx is no higher than the first predetermined temperature T1 which is the acceptable lower limit temperature, the control device 40 performs discharge limit control in which the maximum value of the hydrogen discharge flow rate from the hydrogen tank 12 is limited to the predetermined flow rate. Thus, even when the driver operates the accelerator and the operation amount reaches the maximum or close to the maximum, the discharge flow rate of hydrogen from the hydrogen tank 12 becomes smaller than the maximum flow rate at the normal time when discharge limit control is not performed. Accordingly, rapid decrease in temperature due to the discharge of hydrogen from within the hydrogen tank 12 can be suppressed. Therefore, when the current temperature in the hydrogen tank 12 is low or the residual pressure inside thereof is great, even when a state in which the accelerator operation amount is maximum continues, or the frequency of this state is high, the in-tank temperature can be suppressed from quickly reaching the first predetermined temperature T1 that is the acceptable lower limit, or lower, while enabling the vehicle to continue traveling. Accordingly, the resin liner 13 of the hydrogen tank 12 can be protected while enabling the vehicle to continue traveling.

On the other hand, when the temporal temperature gradient A determined by the in-tank residual pressure P1 is estimated to be moderate due to the in-tank residual pressure P1 being small, as indicated in FIG. 4 by a long dashed short dashed line L2, and also an in-tank attainment temperature Tx1 at time t2 is estimated to exceed the first predetermined temperature T1, and discharge limit control is not currently being executed, the control device 40 does not start discharge limit control.

Note that when hydrogen is discharged from the hydrogen tank 12, the in-tank residual pressure actually gradually decreases with the passage of time, and accordingly, when the predetermined time used for estimating the in-tank attainment temperature Tx becomes longer, there is a possibility that the actual temporal temperature gradient of the in-tank temperature may be smaller than the temporal temperature gradient obtained from the current in-tank residual pressure. Regarding this, according to the embodiment, the in-tank attainment temperature Tx after a predetermined time is estimated assuming that the temporal temperature gradient A will be maintained for a predetermined time, and discharge limit control is performed when the estimated temperature of the in-tank attainment temperature Tx is no higher than the first predetermined temperature T1. Accordingly, the actual in-tank attainment temperature can be suppressed from reaching the first predetermined temperature T1 or lower with ample leeway.

Further, according to the embodiment, after performing discharge limit control, when the in-tank temperature reaches or exceeds a second predetermined temperature T2 that is higher than the in-tank temperature Ta at the time of starting discharge limit control, the control device 40 cancels the limitation on the hydrogen discharge flow rate. For example, when an off state of the accelerator occurs more often or the accelerator operation amount is frequently smaller, after execution of discharge limit control, there are cases in which the in-tank temperature of the hydrogen tank 12 gradually rises in accordance with the ambient air temperature around the hydrogen tank 12. When the limitation on the hydrogen discharge flow rate is cancelled due to the in-tank temperature reaching or exceeding the second predetermined temperature T2 as described above, and when the temperature of the hydrogen tank 12 rises after limit control of hydrogen discharge is performed, normal driving can be resumed, and accordingly the time of causing the user to feel uncomfortable about the traveling performance can be reduced.

Figure 5:
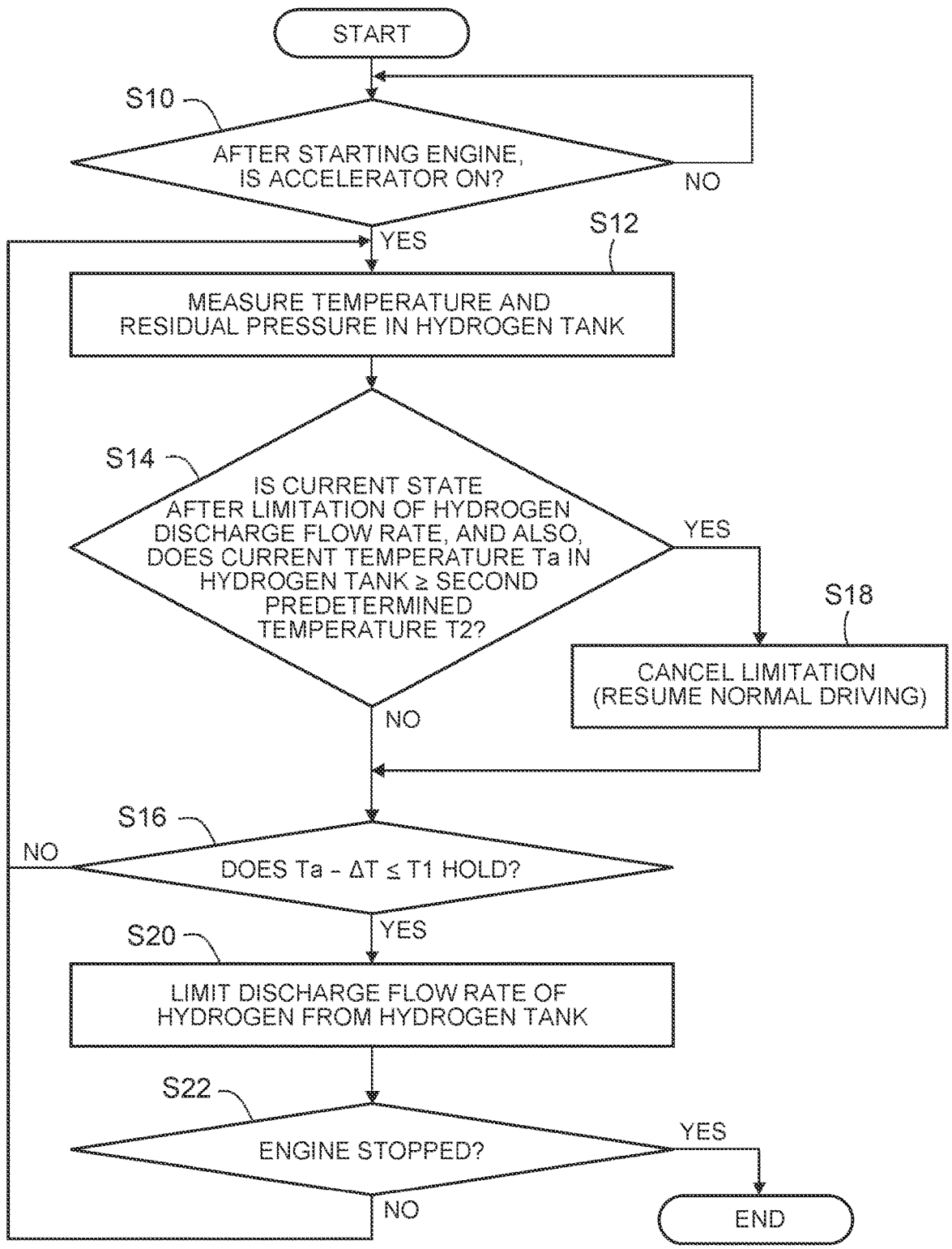
FIG. 5 is a flowchart showing a hydrogen discharge limit control method according to the embodiment.

FIG. 5 is a flowchart showing a hydrogen discharge limit control method according to the embodiment. The processing of each step in FIG. 5 is executed by the control device 40. In step S10, after the hydrogen engine 10 is started, determination is made regarding whether the accelerator is on. When the determination in step S10 is an affirmative determination (YES), the flow transitions to step S12. When the determination in step S10 is a negative determination (NO), the processing in step S10 is repeated.

In step S12, the in-tank temperature is measured by the temperature sensor 21, and the in-tank residual pressure is measured by the pressure sensor 22. In step S14, determination is made regarding whether the current state is after limitation of the hydrogen discharge flow rate, and also whether the current in-tank temperature Ta is no less than the second predetermined temperature T2 used for determining cancellation of discharge limit control. When the determination in step S14 is an affirmative determination (YES), the flow transitions to step S18, discharge limit control is cancelled, and normal driving is resumed. Thus, the time during which discharge of hydrogen is limited can be shortened, and accordingly the time of causing the user to feel uncomfortable about the traveling performance can be reduced. After the processing of step S18, the flow transitions to step S16.

When the determination in step S14 is a negative determination (NO), determination is made regarding whether the in-tank attainment temperature Tx (Ta−ΔT) of the in-tank temperature is no higher than the first predetermined temperature T1 after a predetermined time when the accelerator operation amount is maintained at the maximum, as determination processing of whether to execute hydrogen discharge flow rate limitation in step S16. When the determination in step S16 is an affirmative determination (YES), the flow transitions to step S20, and limit control of the hydrogen discharge flow rate from the hydrogen tank 12 is executed. Accordingly, the in-tank temperature can be suppressed from quickly reaching the first predetermined temperature T1 or lower, and thus continued traveling of the vehicle can be secured, and the resin liner 13 can be protected. After the processing of step S20, the flow transitions to step S22, and determination is made regarding whether the hydrogen engine 10 has been stopped. When the determination in step S22 is an affirmative determination (YES), execution of discharge limit control and the processing of determination are stopped.

On the other hand, when the determination in step S22 is a negative determination (NO), the flow returns to step S12, and the processing of steps S12 to S22 is repeated until an affirmative determination (YES) is obtained in step S22. Further, the flow returns also to step S12 when the determination in step S16 is a negative determination (NO), and the processing is repeated.

Figure 6:
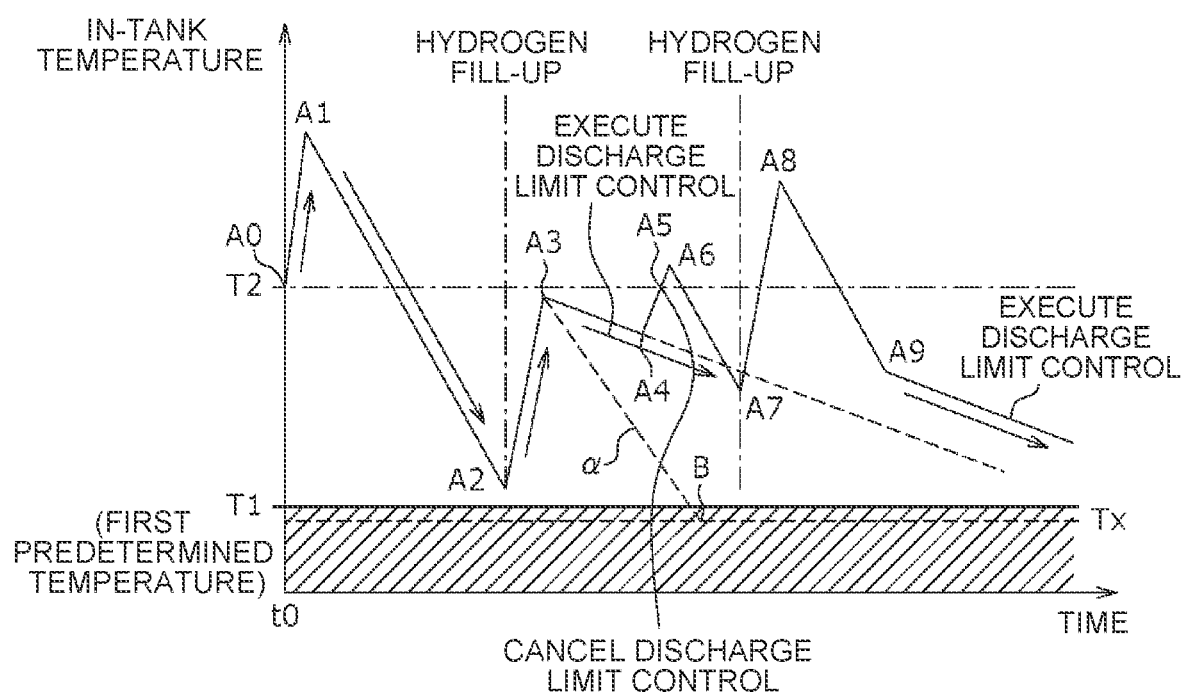
FIG. 6 is a diagram showing an overview of an example of in-tank temperature change during driving of a vehicle, and when filling with hydrogen.

FIG. 6 is a diagram showing an overview of an example of in-tank temperature change during operation of a vehicle, and when filling with hydrogen. In FIG. 6, the vehicle state is shown in relation to time and the in-tank temperature. The vehicle state changes from point A0 at time t0 in the order of points A1, A2 and so on through A9. The first hydrogen fill-up is performed at point A0, and the in-tank temperature gradually rises. The vehicle starts traveling from point A1, and the in-tank temperature gradually decreases as hydrogen is discharged from the hydrogen tank 12. From point A1 to point A2, the vehicle accelerates/decelerates and stops in reality, so the in-tank temperature fluctuates up and down, but as a whole, states in which the accelerator operation amount is large occur often, and the in-tank temperature gradually decreases, substantially linearly, from point A1 to point A2. The tendency of change in the in-tank temperature between two points (e.g., between points A3 and A4, between points A4 and A5, and so on) in operations of the vehicle after point A2 is schematically indicated by a straight line.

The second hydrogen fill-up is performed at point A2, and the in-tank temperature gradually rises and reaches point A3. The vehicle resumes traveling from point A3, and at this time, determination is made that the in-tank attainment temperature Tx will become the first predetermined temperature T1 or lower after the predetermined time elapses at the maximum accelerator operation amount. Specifically, as indicated by a dashed line a in FIG. 6, when assuming that the accelerator operation amount is maximum and the temperature inside the tank decreases, the in-tank attainment temperature Tx is estimated to reach point B at which the in-tank attainment temperature Tx is no higher than the first predetermined temperature T1, after the predetermined time from point A3. Accordingly, discharge limit control in which the maximum value of the discharge flow rate of hydrogen from the hydrogen tank 12 is limited to a predetermined flow rate is executed from point A3. Thus, the temperature decrease of the in-tank temperature becomes moderate from point A3 toward point A4. On the other hand, after point A4, the in-tank temperature gradually rises from point A4, due to the frequency of the accelerator being off increasing in the vehicle, or the like. Discharge limit control is then cancelled due to the in-tank temperature reaching point A5 at which the in-tank temperature is the second predetermined temperature T2. Accordingly, even when the in-tank temperature decreases again from point A6, the limitation on the amount of hydrogen discharged from the hydrogen tank 12 remains cancelled. Thus, the in-tank temperature sharply decreases from point A6 to point A7, due to states in which the accelerator operation amount is high occurring frequently.

From point A7 to point A8 the in-tank temperature rises due to the third hydrogen fill-up being performed, from point A8 to point A9 the in-tank temperature decreases due to states in which the accelerator operation amount is great occurring often, and at point A9 the decrease in in-tank temperature becomes moderate due to discharge limit control being executed.

As can be seen from the results in FIG. 6, when executing discharge limit control according to the embodiment, the in-tank temperature does not readily reach the first predetermined temperature T1 or less between multiple hydrogen fill-ups. Accordingly, it can be seen that the resin liner of the hydrogen tank 12 can be protected while enabling the vehicle to continue traveling.

In the above, in order to estimate the temperature inside the tank after a predetermined time, the predetermined time (t2–t1) is integrated into the in-tank temporal temperature gradient A, and the temperature decrease ΔT of the in-tank temperature at which the accelerator operation amount is maximum is found, as described by way of Expression (1) and Expression (2). On the other hand, the embodiment is not limited thereto, and an arrangement may be made in which the amount of temperature decrease after a predetermined time at the maximum discharge flow rate based on the in-tank temporal temperature gradient A is obtained in advance, and the current in-tank temperature, the in-tank residual pressure, and the above amount of temperature decrease are used to estimate the in-tank temperature after the predetermined time.

What is claimed is:

1. A hydrogen discharge control system being configured to control a hydrogen discharge flow rate in a hydrogen engine vehicle that discharges hydrogen from a hydrogen tank in which a resin liner is laminated on an inner wall, to a hydrogen engine, in accordance with an accelerator operation amount, the hydrogen discharge control system comprising a control device, wherein
   the control device is configured to:
      during an on operation of an accelerator, estimate a temperature attained in the hydrogen tank after a predetermined time elapses with the accelerator operation amount at a maximum, based on a temporal temperature gradient in the hydrogen tank that is determined by a residual pressure in the hydrogen tank when performing hydrogen discharge, and a temperature in the hydrogen tank; and
      when the temperature attained is no higher than a first predetermined temperature, perform discharge limit control for limiting a maximum value of the hydrogen discharge flow rate from the hydrogen tank to a predetermined flow rate.

2. The hydrogen discharge control system according to claim 1, wherein the control device is configured to, when the temperature in the hydrogen tank after performing the discharge limit control is no lower than a second predetermined temperature that is higher than the temperature in the hydrogen tank at a start of the discharge limit control, cancel limitation on the hydrogen discharge flow rate.

3. A hydrogen discharge control method for controlling a hydrogen discharge flow rate in a hydrogen engine vehicle that discharges hydrogen from a hydrogen tank in which a resin liner is laminated on an inner wall, to a hydrogen engine, in accordance with an accelerator operation amount, the hydrogen discharge control method comprising:
   during an on operation of an accelerator, estimating a temperature attained in the hydrogen tank after a predetermined time elapses with the accelerator operation amount at a maximum, based on a temporal temperature gradient in the hydrogen tank that is determined by a residual pressure in the hydrogen tank when performing hydrogen discharge, and a temperature in the hydrogen tank; and
   when the temperature attained is no higher than a first predetermined temperature, performing discharge limit control for limiting a maximum value of the hydrogen discharge flow rate from the hydrogen tank to a predetermined flow rate.

4. The hydrogen discharge control method according to claim 3, further comprising, when the temperature in the hydrogen tank after performing the discharge limit control is no lower than a second predetermined temperature that is higher than the temperature in the hydrogen tank at a start of the discharge limit control, canceling limitation on the hydrogen discharge flow rate.

* * * * *